A. G. ELVIN.
PIPE JOINT.
APPLICATION FILED JULY 18, 1911.
1,030,065.
Patented June 18, 1912.
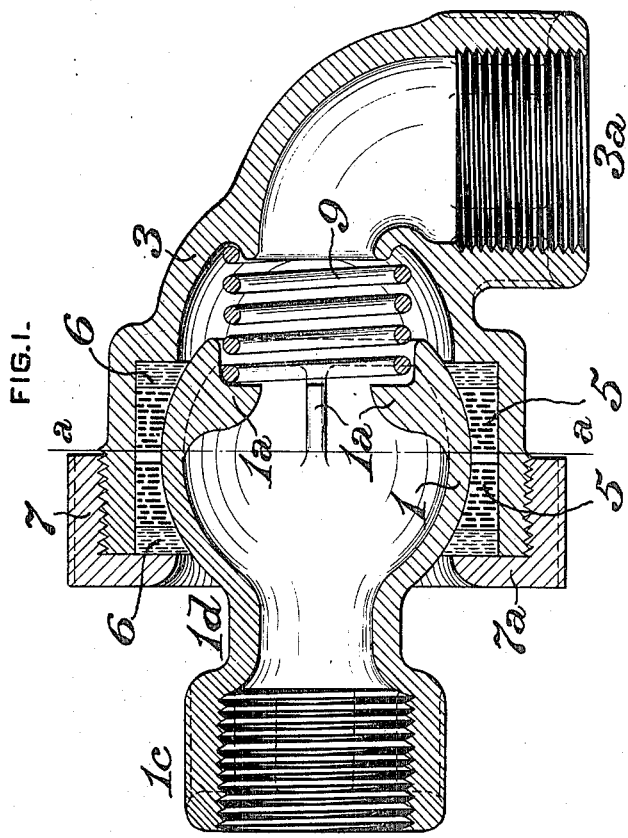
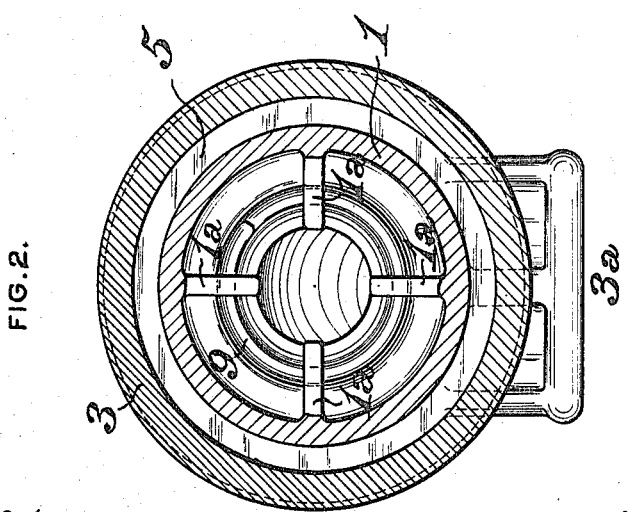
WITNESSES
Edward Wright
S. R. Bell.
INVENTOR.
Albert G. Elvin

UNITED STATES PATENT OFFICE.

ALBERT G. ELVIN, OF SOMERVILLE, NEW JERSEY.

PIPE-JOINT.

1,030,065.

Specification of Letters Patent.

Patented June 18, 1912.

Application filed July 18, 1911. Serial No. 639,082.

*To all whom it may concern:*

Be it known that I, ALBERT G. ELVIN, of Somerville, in the county of Somerset and State of New Jersey, have invented a certain new and useful Improvement in Pipe-Joints, of which improvement the following is a specification.

My present invention relates to joints for the connection of sections of pipes, with the capacity of relative movement without leakage of fluid, and is of the same general type as, and an improvement upon, that for which Letters Patent of the United States No. 946,025, were granted and issued to me under date of January 11, 1910.

The object of my invention is to provide a pipe joint which shall embody the advantages, as to tightness of the joint, and flexibility of the pipe line, of that of Patent No. 946,025 aforesaid, with the further ones of being capable of being more readily molded and of reducing the obstruction to the flow of fluid through the joint.

The improvement claimed is hereinafter fully set forth.

In the accompanying drawing: Figure 1 is a longitudinal central section through a pipe joint embodying my invention; and Fig. 2, a transverse section through the same, on the line *a a* of Fig. 1.

In the practice of my invention, I provide a ball or internal member, 1, which is open at one end, and has an internally threaded nozzle, 1ᶜ, for the connection of a pipe section, at its opposite end, which nozzle is connected with the body of the ball by a short cylindrical neck, 1ᵈ, the internal diameter of which is substantially equal to that of the pipe line sections to be connected. The ball member is fitted, (packing gaskets hereinafter described being interposed) in a socket or external member, 3, having an internally threaded nozzle, 3ᵃ, at its end farther from the ball member, for the connection of a pipe section. The opposite end of the socket is entirely open, and is recessed interiorly to receive gaskets which fit truly between the periphery of the ball and the bore of the recess of the socket. In the instance exemplified, a packing gasket, 5, of the material usually employed, as composition or rubber, and a wear gasket, 6, of soft metal, are located on the inner side of the transverse central plane of the ball, and similar wear and packing gaskets are located on the outer side of said plane, the adjoining packing gaskets being separated by an intervening space. For service under conditions where the ball is not liable to be pressed away from the gaskets, only one packing gasket and one wear gasket need be applied.

The ball, 1, and the packing and wear gaskets are held in position in the socket by a nut, 7, engaging an external thread on the socket, and having an inwardly extending annular flange, 7ᵃ, abutting against the outer side of the adjacent gasket. The nut may, if desired, be locked in position by a split pin or cotter, as in the construction shown in Patent No. 946,025 aforesaid.

The ball 1, is pressed up to the gaskets, with sufficient force to prevent leakage of fluid between its outer surface and said gaskets, and to prevent lost motion and rattling when there is no pressure within the joint, and when the apparatus to which the joint is applied is subjected to shocks and jars, as in the case of locomotives, by a helical spring, 9, which abuts, at one end, on a seat on the socket, 3, and, at the other, on the ends of a plurality of radially extending ribs, 1ᵃ, formed on the inner side of the wall of the ball, adjoining its open end. In the construction of Patent No. 946,025 aforesaid, the pressure of the spring was transmitted to the ball through a central pivot, for the support of which a spider or skeleton frame, extending entirely across the ball, is required. This frame, when made of proper strength obstructed the transverse area of the ball, and prevented the free flow of fluid through it. It will be seen that this objection is obviated by my present invention, and also that the molding of the ball is substantially simplified by the provision of radially extending ribs, having an intervening clear space, for the transverse skeleton frame of Patent No. 946,025.

I claim as my invention, and desire to secure by Letters Patent:

1. In a pipe joint, the combination of a ball member having a plurality of radially extending ribs on the inner side of its wall, a socket member free of said ball member and having a recess, each of said members being fitted for connection to a section of pipe, a gasket fitting between the recess in the socket and the periphery of the ball, a coil spring abutting, at one end, on the wall of the socket, and, at the other, on the ribs of the ball substantially adjacent to the shell of the ball, and a nut engaging the socket and bearing on the gasket.

2. In a pipe joint, the combination of a ball member having a plurality of radially extending ribs on the inner side of its wall, a socket member free of said ball member and having a recess, each of said members being fitted for connection to a section of pipe, packing gaskets and soft metal wear gaskets fitting between the recess in the socket and the periphery of the ball, one of each being located on each side of the transverse central plane of the ball, a coil spring abutting, at one end, on the wall of the socket, and, at the other, on the ribs of the ball substantially adjacent to the shell of the ball, and a nut engaging the socket and bearing on the outermost gasket.

ALBERT G. ELVIN.

Witnesses:
E. L. Myers,
F. W. Martin.